(12) United States Patent
Schwister

(10) Patent No.: US 12,491,424 B2
(45) Date of Patent: Dec. 9, 2025

(54) REMOTE REFEREE SYSTEM AND ASSOCIATED METHOD

(71) Applicant: Ryan Schwister, Jackson, WI (US)

(72) Inventor: Ryan Schwister, Jackson, WI (US)

( * ) Notice: Subject to any disclaimer, the term of this patent is extended or adjusted under 35 U.S.C. 154(b) by 75 days.

(21) Appl. No.: 18/750,123

(22) Filed: Jun. 21, 2024

(65) Prior Publication Data

US 2024/0424375 A1  Dec. 26, 2024

Related U.S. Application Data

(60) Provisional application No. 63/509,595, filed on Jun. 22, 2023.

(51) Int. Cl.
*A63B 71/06* (2006.01)

(52) U.S. Cl.
CPC ...... *A63B 71/0605* (2013.01); *A63B 71/0622* (2013.01); *A63B 2220/806* (2013.01); *A63B 2225/20* (2013.01)

(58) Field of Classification Search
CPC ............ A63B 71/0605; A63B 71/0622; A63B 2220/806; A63B 2225/20; H04N 21/2187; H04N 7/181; H04N 21/21805; G06Q 10/10; G06Q 50/01; G06Q 50/34; G07F 17/323; G07F 17/3288
See application file for complete search history.

(56) References Cited

U.S. PATENT DOCUMENTS

| | | | |
|---|---|---|---|
| 3,651,507 A | 3/1972 | Abbott | |
| 8,799,672 B1 | 8/2014 | Daniel | |
| 2018/0365939 A1 | 12/2018 | Inglot | |
| 2019/0377345 A1* | 12/2019 | Bachrach | ............... G06V 20/17 |

* cited by examiner

*Primary Examiner* — Omeed Alizada
(74) *Attorney, Agent, or Firm* — Wood Herron & Evans LLP

(57) ABSTRACT

A referee officiates a game remotely which removes the potential for altercations between players, coaches, and parents with the referee.
The ability to referee games remotely is possible through WIFI connection with camera technology relaying a live game feed. Referees may be linked through an app where they may be given visibility through camera systems, audio, and communication to perform refereeing duties. Harassment of the refs is eliminated while maintaining the ability to officiate the games remotely.

18 Claims, 9 Drawing Sheets

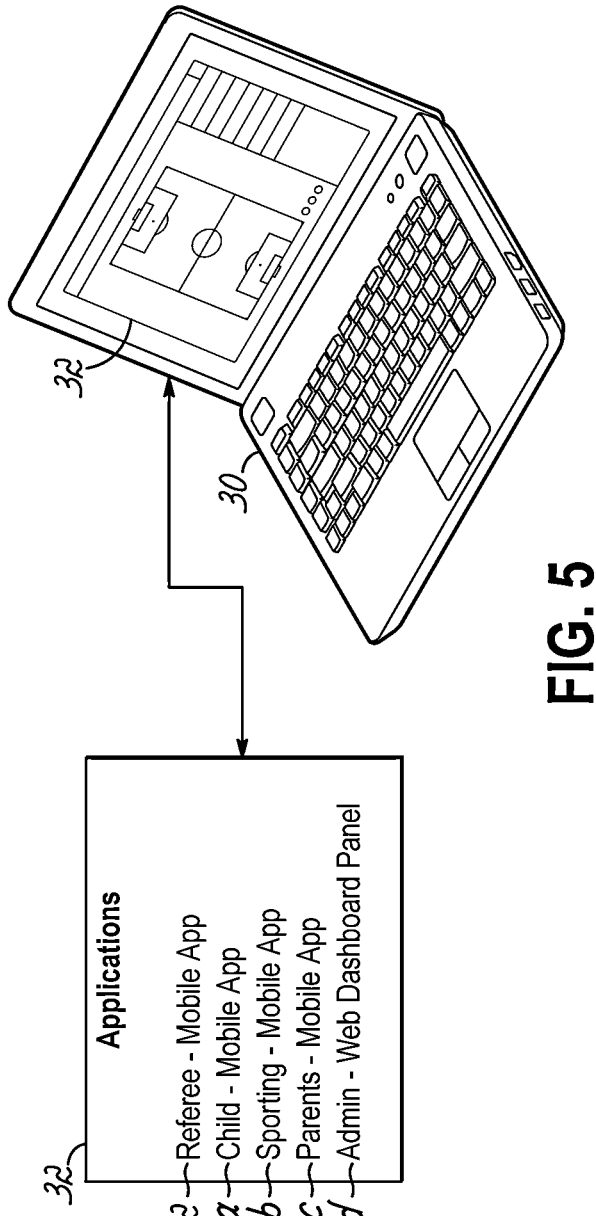

| Applications | Integration | React Native | Framework |
|---|---|---|---|
| 32 — Referee App<br>32a — Child Referee App<br>32b — Sporting Director App<br>32c — Parents App<br>32d — Web Admin Dashboard | Firebase — 62<br>Stripe — 64<br>Cloudflare — 66<br>Youtube — 68<br>Stream Cameras — 70 | High Performance, extensive library support, and flexibility for complex user interfaces. | .NET 8.0: Microservices-based, ensuring modularity, ease of maintenance, and independant scaling. |

REMOTE REFEREE SYSTEM AND ASSOCIATED METHOD

This claims the benefit of U.S. Provisional Patent Application Ser. No. 63/509,595, filed Jun. 22, 2023 and hereby incorporated by reference in its entirety.

BACKGROUND OF THE INVENTION

This invention relates to the officiating, refereeing and umpiring of sporting contests, particularly the remote officiating, refereeing and umpiring of youth sporting contests.

The benefits of participating in sports are well documented, particularly for young athletes. The enjoyment and success of participating in sports is significantly impacted by the ability to have fair, competent and unbiased officiating, refereeing and umpiring controlling and managing the sporting contests. Unfortunately, the availability and interest of quality officials, referees and umpires has become significantly and detrimentally impacted in recent years by challenges, harassment, arguments and otherwise immature reactions to the decisions of the officials, referees and umpires by spectators, athletes and coaches alike. As an example, it has been reported that Little League baseball umpires have refused to umpire future games due to the threats, screaming and harassment from parents and players alike in response to calls made during a particular game. See, *Little League Umpires Quit After Threats From Parents and Players*, Fox Sports, Jun. 12, 2023.

Unfortunately, this is not an isolated incident and many, many youth and other sports organizations report difficulty in fielding qualified officials, referees and umpires because such qualified officials have chosen not to participate in the face of such treatment by spectators and participants alike. Referee shortages in youth sports is particularly acute in youth soccer and little league baseball for athletes ages 5-12 years old.

The number one factor in why there is a referee shortage, is because of the verbal, physical, and mental abuse from the players, coaches, and parents. From 2018 to 2021, an estimated 50,000 high school referees (roughly 20 percent) quit as reported by Dana Pappas, the director of officiating services for the National Federation of State High School Sports per The New York Times. Roughly 19,000 officials in 2019 were asked what their top reason for quitting would be and 60 percent of those responding said verbal abuse from parents and fans per The New York Times.

SUMMARY OF THE INVENTION

These and other problems and shortcomings in the prior art have been addressed by various embodiments of this invention which is a remote referee system and associated method. Embodiments of this invention allow for an umpire or referee to officiate a game remotely which removes the potential for altercations with players, coaches, and parents and referees.

In various embodiments of this invention, the ability to referee games remotely through WIFI connection with camera technology relaying live game feed is provided. The referee is not replaced according to this invention, but allows the ranks of the referee pool to be replenished around the country by eliminating harassment of the referees. Referees may be linked through an app where they may be given visibility through technology like the Traceup and Veotechnologies camera systems, audio, and communication to perform refereeing duties. These communication capabilities may be like Microsoft Teams type system. This invention in various embodiments eliminates harassment by giving referees, officials and umpires the ability to call the games remotely off site.

In one embodiment of this invention, an application (app) may include two separate databases for login purposes and app function (one data base for referees and another for parents/athletic administration). The app may include a login screen for referees and for parents/sporting directors. Referees may upload a profile with time zone, current referee license(s) and experience, as well as days and times of availability. Athletic directors may use the App to post available games needing referees. Parents may use the app for rating the referee based on performance at the conclusions of games, thus keeping the remote refs honest while working remotely.

These and other aspects of various embodiments of this invention allow for the referee, umpire or official to effectively officiate a game or contest without exposing them to a hostile environment while allowing for feedback on the official's performance.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 4 is an overview of one embodiment of this invention;

FIG. 5 is a system overview of the embodiment of FIG. 4;

DETAILED DESCRIPTION OF THE INVENTION

The ability to officiate, umpire or referee a game, match or competition remotely could remove the potential for altercations between players, coaches, and parents with referees.

Figure 1:
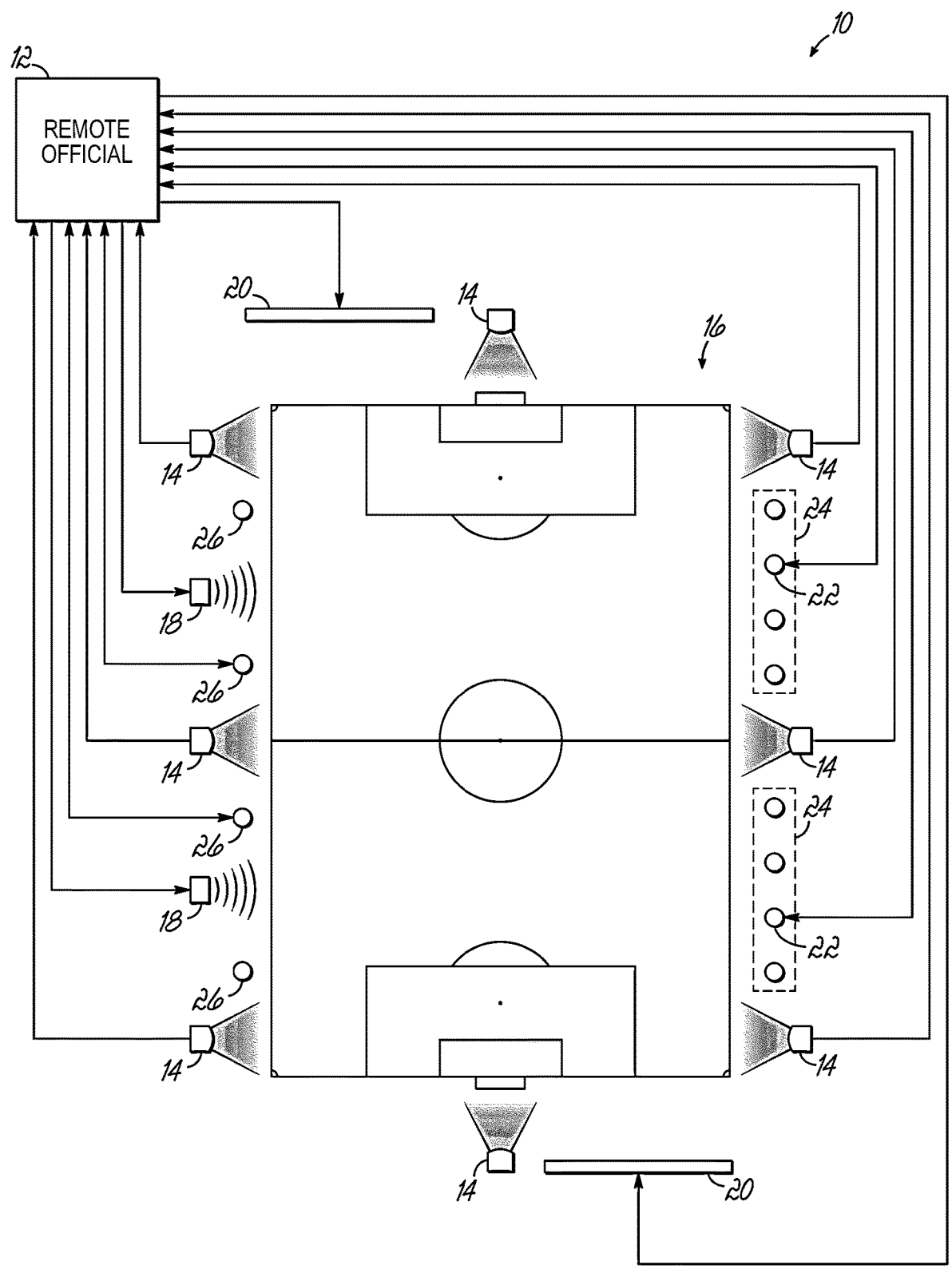
FIG. 1 is an overall layout of the system with various components according to one embodiment of this invention.

One embodiment of a system 10 according to this invention is shown in FIG. 1 including a remote competition or contest official, referee or other game or contest administrator 12. The ref 12 has access to the feeds from a variety of cameras 14 positioned around a game field, pitch, arena or the like 16. A soccer pitch 16 is shown in FIG. 1, but this invention is not limited to a soccer match and can be employed in a variety of other settings or contests.

Audio speakers 18 may also be positioned about the field 16 to provide a means for the ref 12 to communicate to those at or around the field 16. The ref 12 may also have access to video monitors or scoreboards 20 visible to those at or around the field 16 to display contest information or the like, including, but not limited to score, game time, game progress, rules violations, and contest participants. The system 10 may also include direct communication means from the ref 12 to each coach 22 and/or the player's bench area 24 along the sidelines of the field 16. Additionally, the remotely located ref 12 may have access to or be in one or two way communication with others at or near the field 16 such as parents, fans 26 or others such as athletic directors 26a and/or referee assessors 26b.

Figure 2:
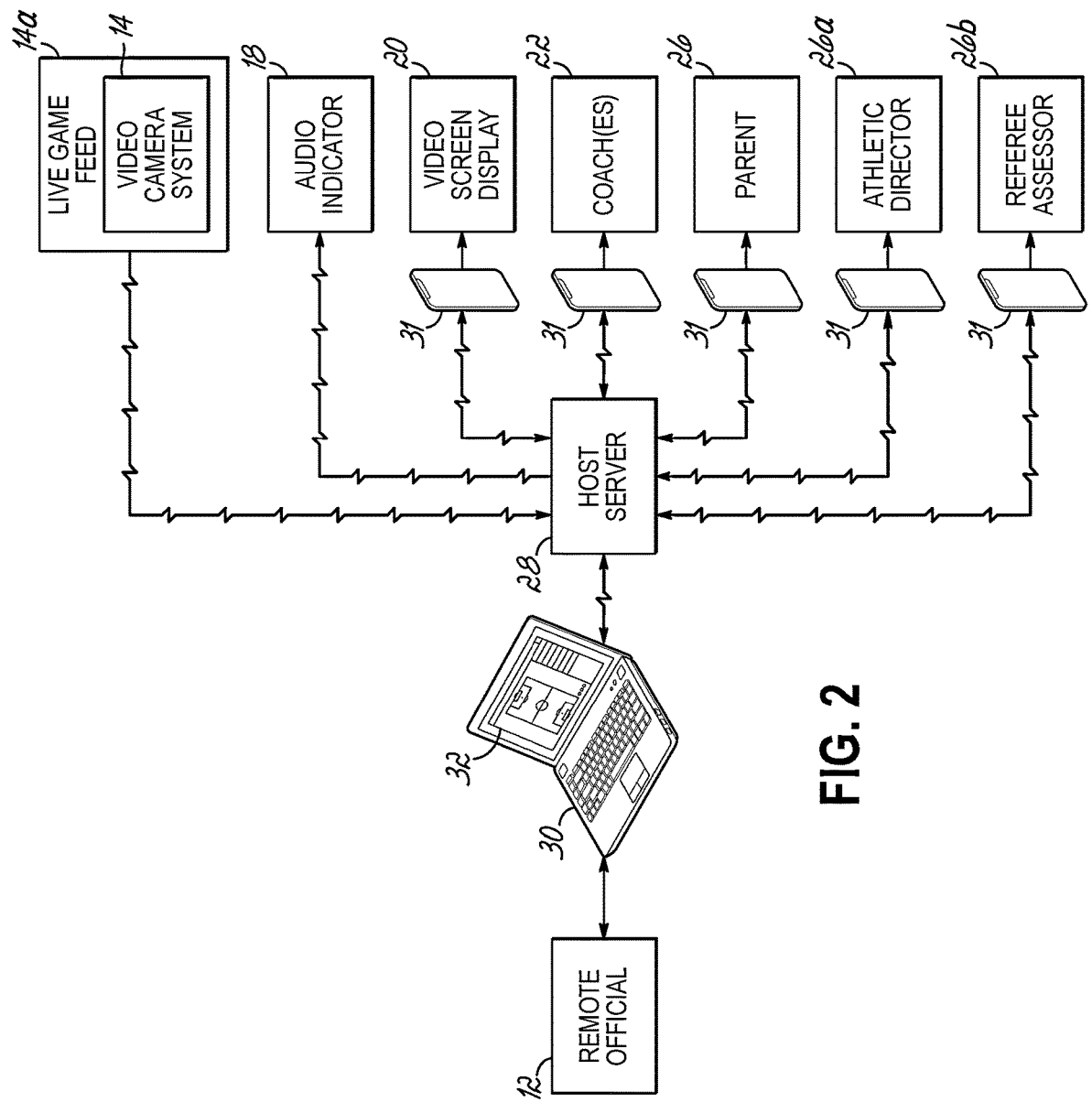
FIG. 2 is a diagram showing how users and equipment are connected according to one embodiment of this invention.

Referring to FIG. 2, the system 10 according to various embodiments of this invention may include a host server 28 which processes and coordinates the various feeds to and from a laptop computer or other electronic device 30 used by the remotely located ref 12. Communication with the host server 28 by an operator of the video monitor 20, coaches 22, parent 26, athletic director 26a and/or the referee assessor 26b may be accomplished via one or more smartphones, tablets, computers, mobile electronic or other devices 32.

In various embodiments of this invention, the ability to referee games remotely through WIFI connection with camera technology relaying live game feed. This invention is not aimed at replacing the physical referee, but only to replenish the referee ranks around the country by eliminating harassment by giving referees 10 the ability to call the games remotely. Referees 10 may be linked through an app 32 where they could be given visibility through technology like the Traceup and Veotechnologies camera systems, audio, and communication to perform refereeing duties. These communication capabilities could be a Microsoft Teams type system.

This invention in various embodiments eliminates harassment by giving referees, officials and umpires 12 the ability to call the games remotely off site from the field or pitch 16.

In one embodiment, this invention operates as follows. An application (app) could consist of two separate databases for login purposes and app function (one data base for referees 12 and another for parents/athletic administration 26). The app 32 may consist of a login screen for referees 12 and for parents/sporting directors 26. Referees 12 could upload a profile with time zone, current referee license(s) and experience, as well as days and times of availability. Directors 26a may use the app 32 to post available games needing referees 12. Parents 26 could use the app 32 for rating the referee 12 based on performance at the conclusions of games, thus keeping the remote refs12 faithful while working remotely.

The app 32 could consist of at least three people logged in to the app: referee 12, coach 22, and parent 26. The video feed 14 could relay the game feed to the remote referee 12. Video technology like the Traceup and Veotechnology camera systems could be employed in various embodiments of this invention. The remote referee 12 could relay stoppages to the coaches 22 to halt game for fouls/changes of possession and the like. The remote referee 12 could relay these stoppages via communication systems like Microsoft teams. The coaches 22 could then stop the game via voice, whistle, or buzzer. The remote ref 12 could use voice communication with both present coaches 22 for stoppages via the app's audio and the speakers 18. More than three users could log in if need be, such as the ref 12, each team's coach 22, and (4) a third party like a sporting director 26a to help ensure the remote referees calls are being relayed to participating teams via coaches' instruction.

Another aspect of various embodiments of this invention is the ability to rate the referee 12. This could be accomplished with the parent's participation in the app 32. Parents 26 could rate referee 12 after the game on a scale of 1-5 stars, for example. More than one parent on each team could log into the app 32 after the game to rate the referee 12. This rating could be a way for the parents 26 to show their opinion of the referee's performance and stoppage accuracy. Parents 26 attending the game may rate referee. This rating scale could provide incentive for the remote referees 12. The higher the rating could relate to more visibility to available games via a notification system through the app 32. This rating could also keep the remote referee 12 accountable and actively participating during games.

Another aspect of embodiments of this invention is the scheduling of officials, referees and umpires 12. Within the remote referee's app 32 profile, the referees 12 could add their availability for future games, matches and contests. This availability could consist of specific days and times of the week they are available. The referee's availability could link to a notification system in the app 32 to notify the referee 12 when sporting directors/managers 26a post available games on the app 32 matching their previous data entry.

Embodiments of this invention also include a profile of the referee, official or umpire 12. The remote referee's profile on the app 32 could consist of schedule availability, current referee licenses, and payment options (Cash-app, Venmo, Zell). The referee 12 could have the option to edit/update their profile when needed. For example, where a higher refereeing license has been obtained the profile could be updated in the app 32.

In various embodiments of this invention, infractions called by the referee 12 are relayed and/or communicated via smart phone or watch technology through the mobile app 32 to the coaches 22 on the sideline, as well as being displayed on a flat screen LED television 20 around the field and/or sports complex 16 hosting the contest.

In various embodiments of this invention, the remote referee 12 could be physically present at games, but blend in with the crowd instead of being on the field 16. If refereeing this way, the referee 12 could access a communication system like Microsoft Teams and communicate with both teams' coaches 22.

Figure 3:
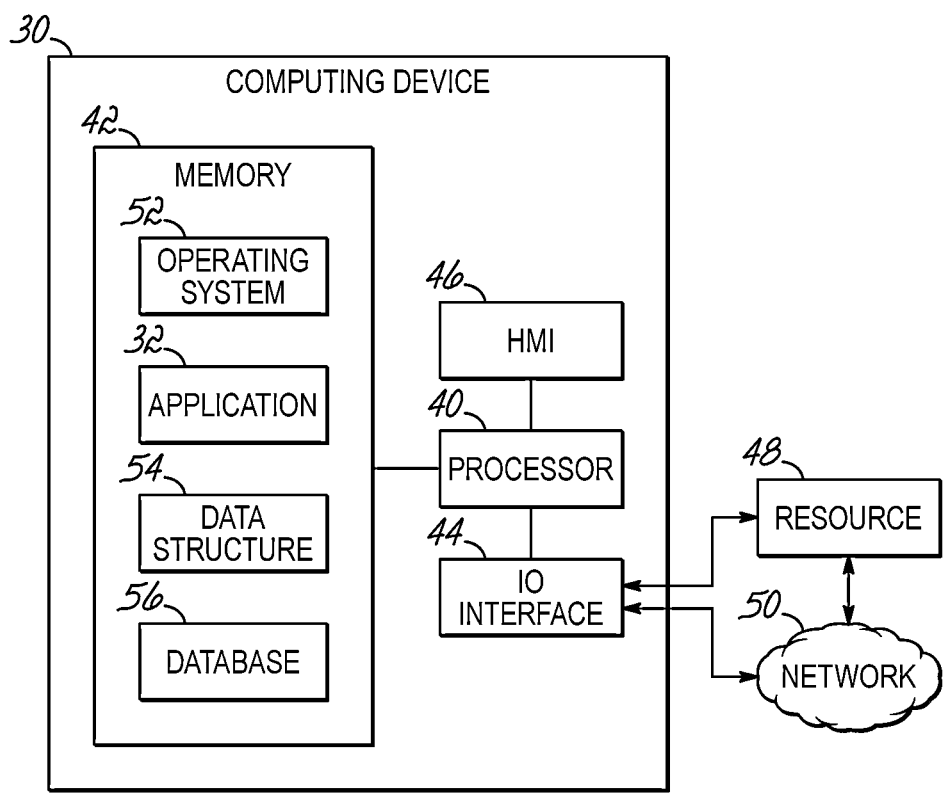
FIG. 3 is a diagram of one embodiment of a computer network according to various embodiments of this invention.

Referring now to FIG. 3, embodiments of this invention described above, or portions thereof, may be implemented using one or more computing devices or systems, such as exemplary computer 30. The computer 30 may include a processor 40, a memory 42, an input/output (I/O) interface 44, and a Human Machine Interface (HMI) 46. The computer 30 may also be operatively coupled to one or more external resources 48 via a network 50 or I/O interface 44. External resources may include, but are not limited to, servers, databases, mass storage devices, peripheral devices, cloud-based network services, or any other resource that may be used by the computer 30.

The processor 40 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions stored in memory 42. Memory 42 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or data storage devices such as a hard drive, optical drive, tape drive, volatile or non-volatile solid state device, or any other device capable of storing data.

The processor 40 may operate under the control of an operating system 52 that resides in memory 42. The operating system 52 may manage computer resources so that computer program code embodied as one or more computer software applications, such as the application 32 residing in memory 42, may have instructions executed by the processor 40. In an alternative embodiment, the processor 40 may execute the application 32 directly, in which case the operating system 52 may be omitted. One or more data structures 54 may also reside in memory 42, and may be used by the processor 40, operating system 52, or application 32 to store or manipulate data.

The I/O interface 44 may provide a machine interface that operatively couples the processor 40 to other devices and systems, such as the external resource 48 or the network 50. The application 32 may thereby work cooperatively with the external resource 48 or network 50 by communicating via the I/O interface 44 to provide the various features, functions, applications, processes, or modules comprising embodiments of the present invention. The application 32 may also have program code that is executed by one or more external resources 48, or otherwise rely on functions or signals provided by other system or network components external to the computer 30. Indeed, given the nearly endless hardware and software configurations possible, persons having ordinary skill in the art will understand that embodiments of the present invention may include applications that are located externally to the computer 30, distributed among multiple computers or other external resources 48, or provided by computing resources (hardware and software) that are provided as a service over the network 50, such as a cloud computing service.

The HMI 46 may be operatively coupled to the processor 40 of computer 30 to allow one to interact directly with the computer 30. The HMI 46 may include video or alphanumeric displays, a touch screen, a speaker, and any other suitable audio and visual indicators capable of providing data to the patient. The HMI 46 may also include input devices and controls such as an alphanumeric keyboard, a pointing device, keypads, pushbuttons, control knobs, microphones, etc., capable of accepting commands or input from the patient and transmitting the entered input to the processor 40.

A database 56 may reside in memory 42, and may be used to collect and organize data used by the various systems and modules described herein. The database 56 may include data and supporting data structures that store and organize the data. In particular, the database 56 may be arranged with any database organization or structure including, but not limited to, a relational database, a hierarchical database, a network database, or combinations thereof. A database management system in the form of a computer software application executing as instructions on the processor 40 may be used to access the information or data stored in records of the database 56 in response to a query, which may be dynamically determined and executed by the operating system 52, other applications 32, or one or more modules.

Another embodiment of the system 10 according to this invention is shown in FIGS. 4-11. Referring to FIG. 4, the app 32 according to this embodiment may be designed to tackle the referee shortage in youth sports by enabling referees 12 to officiate games remotely, thereby enhancing safety and reducing harassment. This system 10 may utilize Wi-Fi and cameras 14 to stream live game feeds and ensure effective and fair officiating of the contest. The system 10 may include the app 32 which may be modified for specific users, including the ref app 32, a child ref app 32a, the athletic/sporting director app 32b, a parent app 32c, and a web administrator dashboard 32d. The integration module 6o may include Firebase™ 62, Stripe™ 64, Cloudfare™ 66, YouTube™ 68 and Stream™ cameras 70. High performance and extensive library support may offer flexibility for complex user interfaces via a react native module 72. The framework 74 may utilize .NET 8.0 microservices as shown in FIG. 4.

A system overview is shown in FIG. 5 of this embodiment which develops a cross-platform app 32 using react native 72 which allows for the minimization of development time, database streamlining, and maintenance reduction while providing a positive user experience across all platforms.

Figure 6:
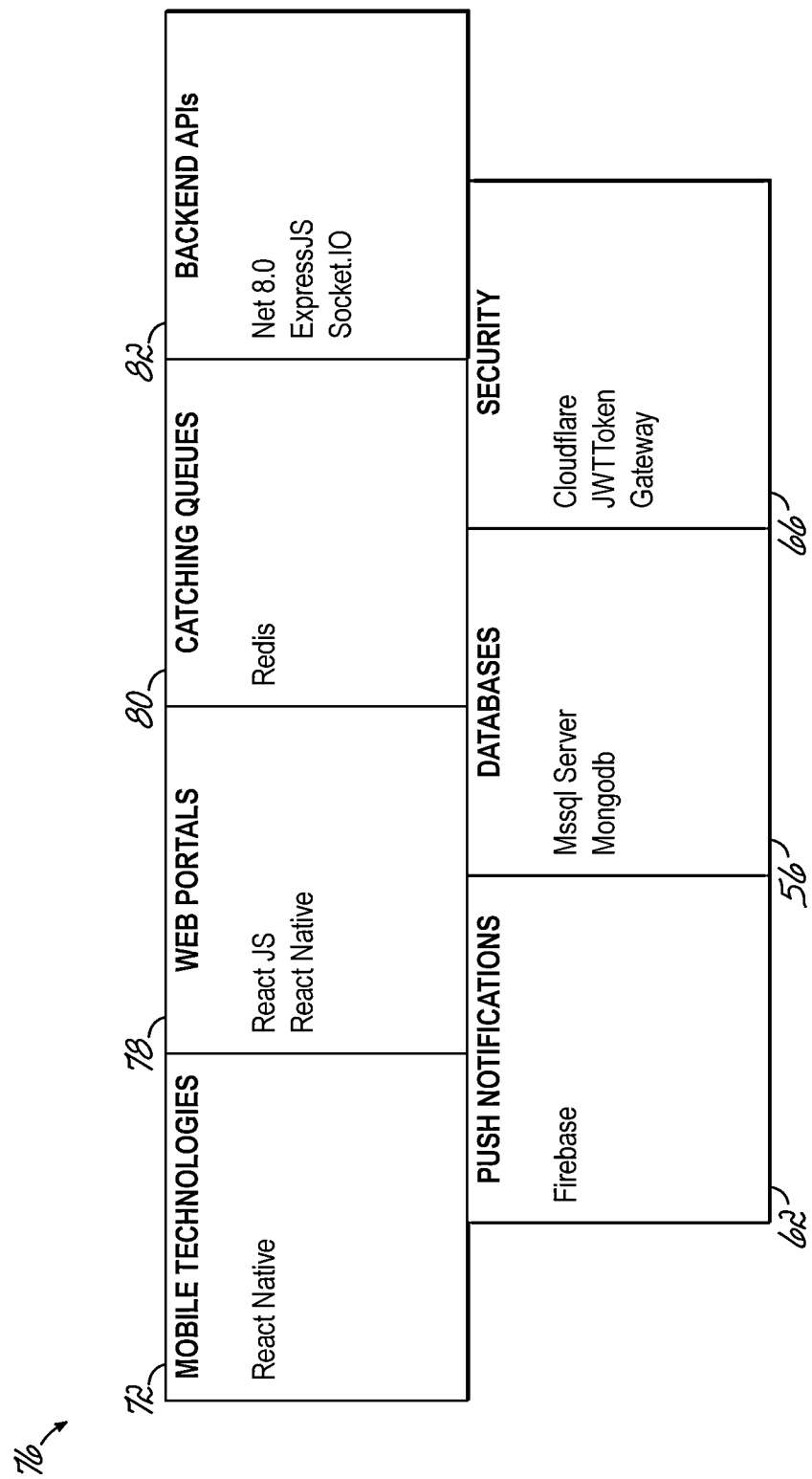
FIG. 6 shows a technology stack of the embodiment of FIGS. 4-5.

In FIG. 6, the technology stack 76 for this embodiment is shown including mobile technologies via React Native™ 72, web portals 78, catching and queues 80, backend APIs 82, push notifications via Firebase™ 62, databases 56, and security via Cloudfare™ and others 66.

Figure 7:
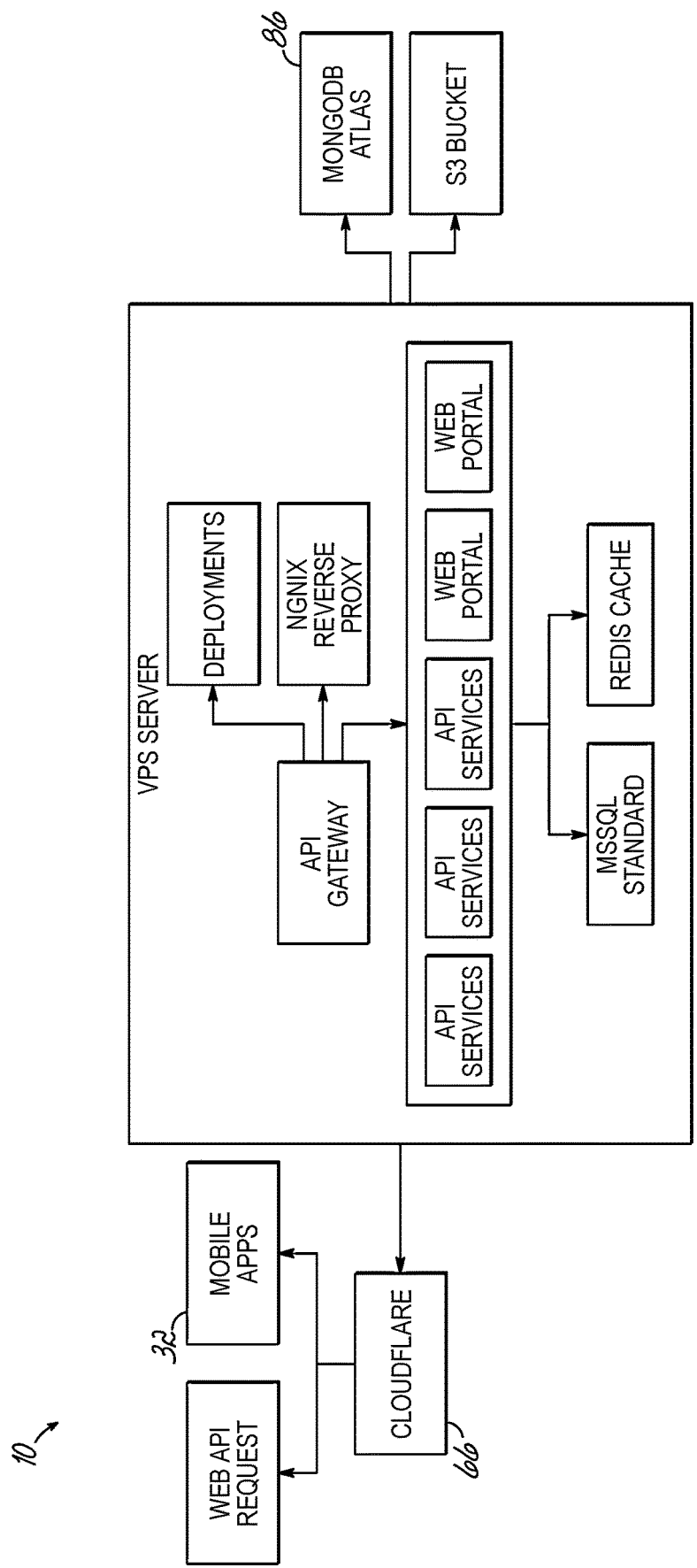
FIG. 7 shows the infrastructure and scalability aspects of the embodiment of FIGS. 4-6.

In FIG. 7 the infrastructure and scalability is demonstrated with the understanding that traffic for the app 32 and system in general 10 grows gradually. With that in mind, VPS hosting may be initially utilized to optimize initial investment and prevent unnecessary spending on infrastructure and provide a cost effective solution as use grows.

Figure 8:
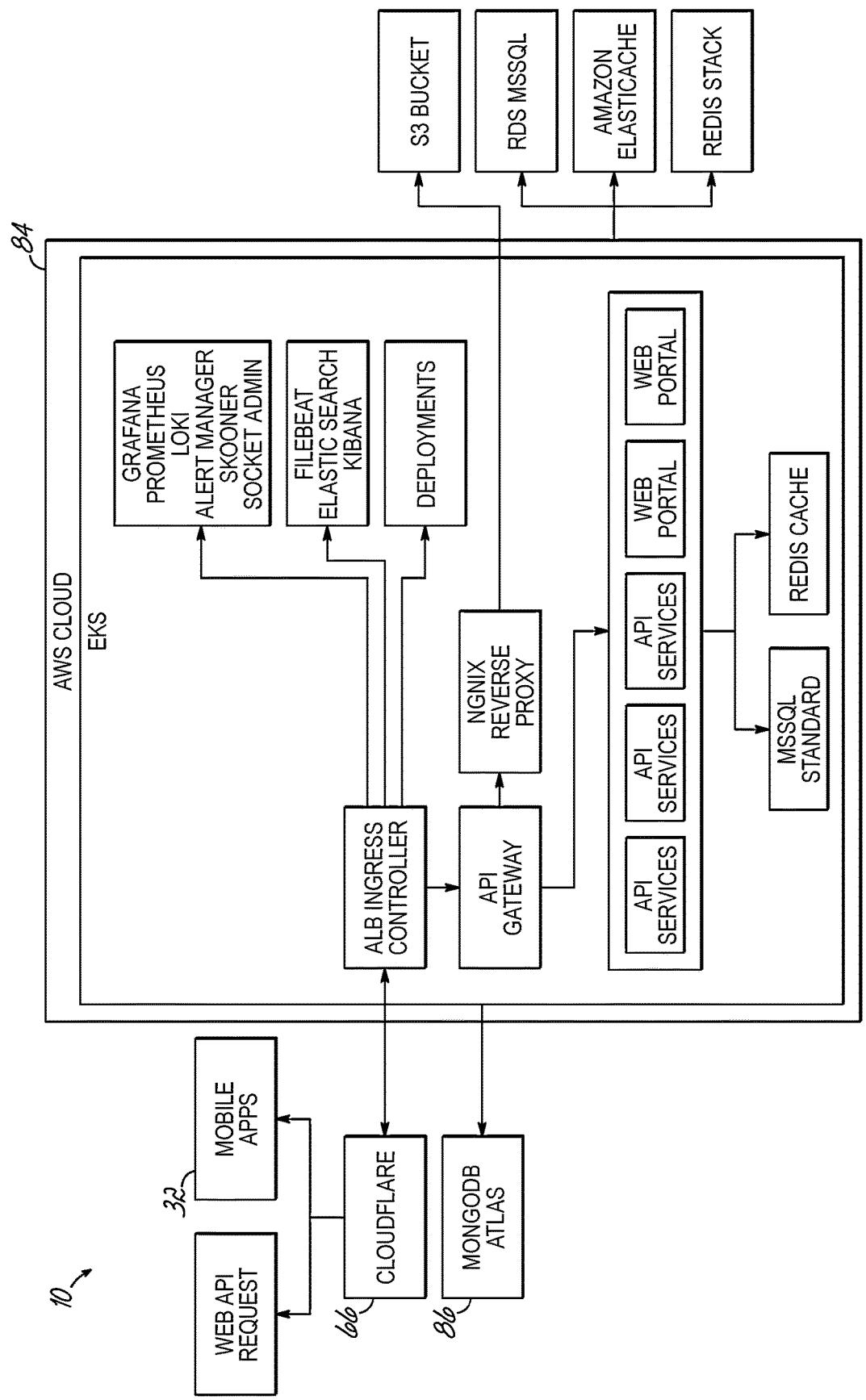
FIG. 8 shows the infrastructure of the embodiment of FIGS. 4-7.

The infrastructure of this embodiment is further shown in FIG. 8. The infrastructure leverages services such as AWS Cloud™ 84 and Cloudfare™ 66 which adhere to international compliance standards including general data protection regulations or GDPR to allow for data security across various regions. MongoDB Atlas™ 86 with data mobility and residency (DMVR) benefits further security by complying with local data protection and residency requirements.

Figure 9:
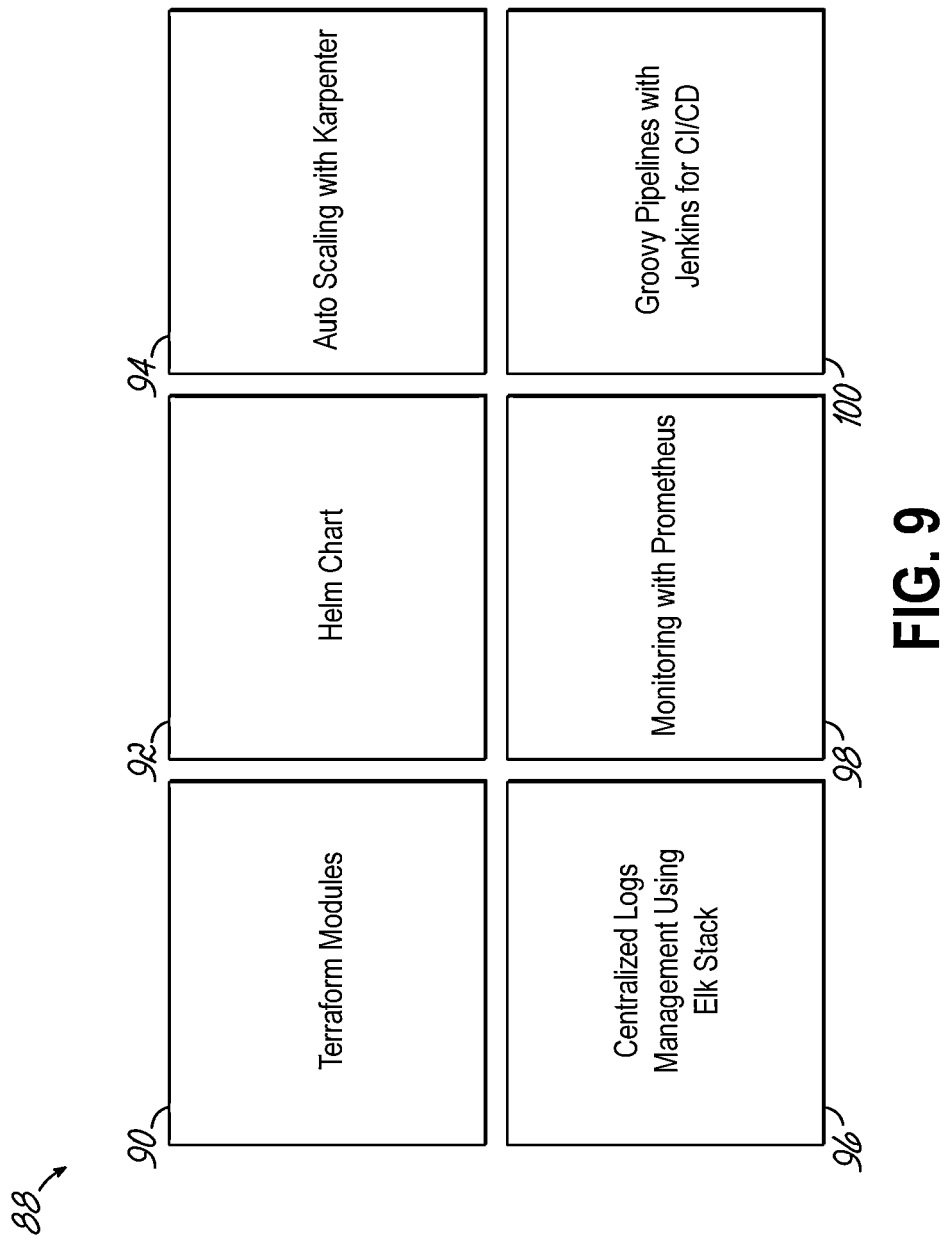
FIG. 9 shows the infrastructure as code of the embodiment of FIGS. 4-8.

FIG. 9 shows the code infrastructure of this embodiment which allows for scalability, reliability and rapid deployment with technology driven operations. The infrastructure 88 may include Terraform Modules™ 90, Helm Chart™ 92, auto scaling with Karpenter™ 94, log management 96, monitoring 98 and pipelines 100.

Figure 10:
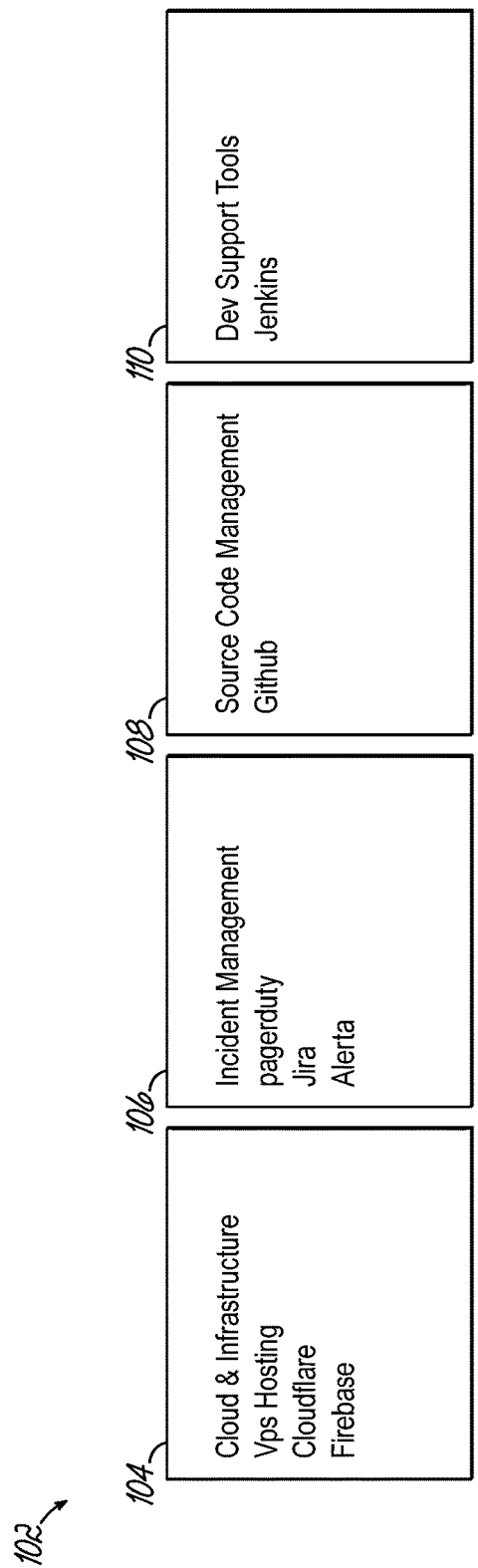
FIG. 10 shows the software and services associated with the embodiment of FIGS. 4-9.

The software and services 102 according to this embodiment are shown in FIG. 10 which include a wide range of digital products and technical support to enhance operational efficiency and user experience. These may include application developed modules and/or cloud-based solutions for managed IT services. The software and services 102 may include a cloud and infrastructure module 104, an incident management module 106, a source code management module 108 and a developmental support tools module 110.

Figure 11:
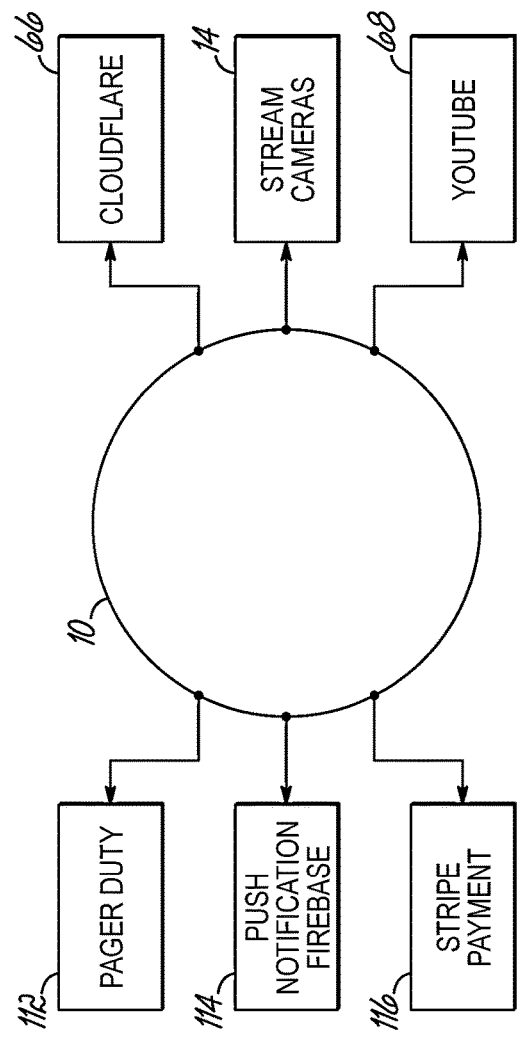
FIG. 11 shows the integration of the various systems of the embodiment of FIGS. 4-10.

The integration of the system 10 is shown in FIG. 11 according to this embodiment. The connectivity is streamlined between different software systems to enable seamless data exchange and enhanced functionality. The system 10 provides integration of pager duty 112, push notification 114, payment 116, YouTube™ 68, cameras 14 and Cloudfare™ 66 among other modules as shown in FIG. 11.

In general, the routines executed to implement the embodiments of this invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations or elements embodying the various aspects of the embodiments of the present invention. Computer-readable program instructions for carrying out operations of the embodiments of the present invention may be, for example, assembly language, source code, or object code written in any combination of one or more programming languages.

Various program code described herein may be identified based upon the application within which it is implemented in specific embodiments of the present invention. However, it should be appreciated that any particular program nomenclature which follows is used merely for convenience, and thus the present invention should not be limited to use solely in any specific application identified or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the present invention are not limited to the specific organization and allocation of program functionality described herein.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the present invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, or operations specified in the flowcharts, sequence diagrams, or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, or operations specified in the text of the specification, flowcharts, sequence diagrams, or block diagrams.

The flowcharts and block diagrams depicted in the drawings illustrate the architecture, functionality, or operation of possible implementations of systems, methods, or computer program products according to various embodiments of the present invention. In this regard, each block in the flowchart or block diagrams may represent a module, segment, or portion of instructions, which comprises one or more executable instructions for implementing the specified logical function or functions.

In certain alternative embodiments, the functions, acts, or operations specified in the flowcharts, sequence diagrams, or block diagrams may be re-ordered, processed serially, or processed concurrently consistent with embodiments of the present invention. Moreover, any of the flowcharts, sequence diagrams, or block diagrams may include more or fewer blocks than those illustrated consistent with embodiments of the present invention. It should also be understood that each block of the block diagrams or flowcharts, or any combination of blocks in the block diagrams or flowcharts, may be implemented by a special purpose hardware-based system configured to perform the specified functions or acts, or carried out by a combination of special purpose hardware and computer instructions.

The terminology used herein is for the purpose of describing particular embodiments only and is not intended to be limiting of the embodiments of this invention. As used herein, the singular forms "a", "an" and "the" are intended to include both the singular and plural forms, and the terms "and" and "or" are each intended to include both alternative and conjunctive combinations, unless the context clearly indicates otherwise. It will be further understood that the terms "comprises" or "comprising," when used in this specification, specify the presence of stated features, integers, actions, steps, operations, elements, or components, but do not preclude the presence or addition of one or more other features, integers, actions, steps, operations, elements, components, or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the present invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The present invention in its broader aspects is therefore not limited to the specific details, representative apparatus and method, and illustrative examples shown and described. Accordingly, departures may be made from such details without departing from the spirit or scope of the Applicant's general inventive concept.

From the above disclosure of the general principles of this invention and the preceding detailed description of at least one embodiment, those skilled in the art will readily comprehend the various modifications to which this invention is susceptible. Therefore, I desire to be limited only by the scope of the following claims and equivalents thereof.

I claim:

1. A system for officiating a contest on a contest space comprising:
   a contest official located remotely from the contest space;
   a plurality of cameras each providing a view of the contest space and a video feed of the associated view;
   a speaker providing audio output at the contest space from an audio feed;
   a video monitor proximate the contest space displaying a video graphic from a video feed;
   a contest official electronic device; and
   a server for receiving and transmitting each of the video feeds, audio feed, and video feed to and from the contest official electronic device;
   a coach communication device accessible to a coach of a contestant proximate the contest space and adapted to receive officiating communications from the contest official electronic device;
   wherein the contest official officiates the contest occurring on the contest space remotely from the contest space via the contest official electronic device based on each video feed received from the server and directions transmitted to the contest space via the speaker or video monitor; and
   wherein the coach communication device is capable of being in a two-way communication with the contest official electronic device.

2. The system of claim 1 wherein the video feed comprises rules violations determined by the contest official and contest status.

3. The system of claim 1 further comprising:
   a spectator communication device accessible to a spectator of the contest and adapted to transmit at least one contest official commentary and contest commentary.

4. The system of claim 1 wherein the spectator is one of a parent of a contestant participating in the contest and an assessor of the contest official.

5. The system of claim 1 further comprising:
   a memory accessible to the contest official electronic device and the server, the memory containing a database of credentials of the contest official, scheduling information and contest information.

6. The system of claim 2 further comprising:
   a coach communication device accessible to a coach of a contestant proximate the contest space and adapted to receive officiating communications from the contest official electronic device.

7. The system of claim 6 further comprising:
   a spectator communication device accessible to a spectator of the contest and adapted to transmit at least one contest official commentary and contest commentary, wherein the spectator is one of a parent of a contestant participating in the contest and an assessor of the contest official.

8. The system of claim 7 further comprising:
   a memory accessible to the contest official electronic device and the server, the memory containing a database of credentials of the contest official, scheduling information and contest information.

9. A method of officiating a contest on a contest space comprising the steps of:
   positioning a contest official remotely from the contest space;
   providing a plurality of views of the contest space and a plurality of video feeds each of which is one of the plurality of views of the contest space;
   providing an audio feed to produce an audio output at the contest space from an audio feed;
   providing a video graphic at the contest space from a video feed;
   originating the audio feed and the video feed from the contest official remote from the contest space;
   receiving the plurality of video feeds by the contest official remote from the contest space;
   receiving officiating communication from the contest official electronic device by a coach communication device accessible to a coach of a contestant proximate the contest space;
   receiving and transmitting each of the video feeds, audio feed, and video feed to and from the contest via a server;
   wherein the coach communication device is capable of being in a two-way communication with the contest official electronic device; and
   wherein the contest official officiates the contest occurring on the contest space remotely from the contest space via a contest official electronic device based on each video feed received from the server and directions transmitted to the contest space via the speaker or video monitor.

10. The method of claim 9 wherein the video feed comprises rules violations determined by the contest official and contest status.

11. The method of claim 9 further comprising:
    transmitting at least one contest official commentary and contest commentary from a spectator communication device accessible to a spectator of the contest.

12. The method of claim 10 further comprising:
    communicating an assessment of the contest official from the contest space.

13. The method of claim 9 further comprising:
    storing in a memory accessible to the contest official electronic device and the server a database of credentials of the contest official, scheduling information and contest information.

14. The method of claim 10 further comprising:
    receiving officiating communications from the contest official electronic device by a coach communication device accessible to a coach of a contestant proximate the contest space.

15. The method of claim 14 further comprising:
    transmitting at least one contest official commentary and contest commentary from a spectator communication device accessible to a spectator of the contest.

16. The method of claim 15 further comprising:
    communicating an assessment of the contest official from the contest space.

17. The method of claim 16 further comprising:
    storing in a memory accessible to the contest official electronic device and the server a database of credentials of the contest official, scheduling information and contest information.

18. A computer program product comprising: a non-transitory computer-readable storage medium; and program code stored on the non-transitory computer-readable storage medium that, when executed by one or more processors, causes the one or more processors to:
    provide a plurality of views of the contest space and a plurality of video feeds each of which is one of the plurality of views of the contest space;

provide an audio feed to produce an audio output at the contest space from an audio feed;
provide a video graphic at the contest space from a video feed;
originate the audio feed and the video feed from a contest official remote from the contest space;
receive the plurality of video feeds by the contest official remote from the contest space;
receive officiating communication from the contest official electronic device by a coach communication device accessible to a coach of a contestant proximate the contest space;
receive and transmitting each of the video feeds, audio feed, and video feed to and from the contest via a server;
wherein the coach communication device is capable of being in a two-way communication with the contest official electronic device; and
wherein the contest official officiates the contest occurring on the contest space remotely from the contest space via a contest official electronic device based on each video feed received from the server and directions transmitted to the contest space via the speaker or video monitor.

* * * * *